(12) United States Patent
Sonneborn

(10) Patent No.: US 9,932,210 B2
(45) Date of Patent: Apr. 3, 2018

(54) COUPLING DEVICE

(71) Applicant: SIEMAG TECBERG GmbH, Haiger (DE)

(72) Inventor: Stephan Sonneborn, Bad Laasphe (DE)

(73) Assignee: SIEMAG TECBERG GMGH, Haiger (DE)

( * ) Notice: Subject to any disclaimer, the term of this patent is extended or adjusted under 35 U.S.C. 154(b) by 369 days.

(21) Appl. No.: 14/761,107

(22) PCT Filed: Jan. 17, 2014

(86) PCT No.: PCT/EP2014/050894
§ 371 (c)(1),
(2) Date: Jul. 15, 2015

(87) PCT Pub. No.: WO2014/111515
PCT Pub. Date: Jul. 24, 2014

(65) Prior Publication Data
US 2015/0368076 A1    Dec. 24, 2015

(30) Foreign Application Priority Data

Jan. 18, 2013 (DE) .................. 10 2013 000 830

(51) Int. Cl.
*B66D 1/16* (2006.01)
*B66D 1/26* (2006.01)
(Continued)

(52) U.S. Cl.
CPC ............... *B66D 1/16* (2013.01); *B66D 1/26* (2013.01); *F16D 11/14* (2013.01); *F16D 28/00* (2013.01); *F16D 2011/004* (2013.01)

(58) Field of Classification Search
CPC .. B66D 1/16; B66D 1/26; F16D 11/14; F16D 2011/004
See application file for complete search history.

(56) References Cited

U.S. PATENT DOCUMENTS 4,396,102 A * 8/1983 Beach ..................... B66D 1/16
192/114 R
5,678,805 A * 10/1997 Moser .................. A63B 47/021
242/388.8
(Continued)

FOREIGN PATENT DOCUMENTS

CN    201746207 U    2/2011
DE       594707 C    3/1934
(Continued)

*Primary Examiner* — Emmanuel M Marcelo
(74) *Attorney, Agent, or Firm* — 24 IP Law Group; Timothy R DeWitt

(57) ABSTRACT

The invention relates to a plugging device for releasably connecting the drum wheel (2) of the at least one loose drum rotatably mounted on the main shaft of a winding engine, said drum wheel being rigidly connected to the loose drum, to the shaft wheel (4) which is rigidly connected to the main shaft. The releasable connection of the drum wheel (2) to the shaft wheel (4) is carried out in a formfitting manner by means of an engageable and disengageable sliding wheel (6) which is guided on a shaft wheel (4). Actuations (10) are carried out in points in a distributed manner over the circumference of the sliding wheel, said actuations acting directly on the sliding wheel (6), in order to engage and disengage the sliding wheel (6).

10 Claims, 3 Drawing Sheets

(51) Int. Cl.
*F16D 11/14* (2006.01)
*F16D 28/00* (2006.01)
*F16D 11/00* (2006.01)

(56) References Cited

U.S. PATENT DOCUMENTS

| | | | |
|---|---|---|---|
| 7,891,641 B1 * | 2/2011 | Miller | B66D 1/16 |
| | | | 254/344 |
| 2005/0161655 A1 * | 7/2005 | Copp | B66D 1/16 |
| | | | 254/346 |
| 2011/0274231 A1 * | 11/2011 | Ketcham | B66D 1/26 |
| | | | 376/260 |
| 2012/0125137 A1 * | 5/2012 | Maupin | F16D 11/14 |
| | | | 74/490.07 |
| 2013/0334000 A1 * | 12/2013 | Gerauer | F16D 11/14 |
| | | | 192/69.7 |
| 2013/0334001 A1 * | 12/2013 | Albrecht | F16D 11/14 |
| | | | 192/69.7 |
| 2014/0326569 A1 | 11/2014 | Hofmann et al. | |
| 2015/0076428 A1 | 3/2015 | Schroeder | |
| 2016/0356341 A1 * | 12/2016 | Flemming | F16H 3/66 |
| 2017/0175824 A1 * | 6/2017 | Timoney | F16D 23/14 |

FOREIGN PATENT DOCUMENTS

| | | |
|---|---|---|
| DE | 922 194 B | 1/1955 |
| DE | 1200491 B | 9/1965 |
| DE | 29 43 639 A1 | 5/1981 |
| DE | 10 2012 109398 B3 | 12/2013 |
| EP | 0 062 029 A2 | 10/1982 |
| GB | 1401188 A | 7/1975 |
| WO | 2013/079699 A1 | 6/2013 |
| WO | 2014053299 A1 | 4/2014 |

* cited by examiner

COUPLING DEVICE

BACKGROUND OF THE INVENTION

Field of the Invention

The present invention relates to a coupling device for hoisting machines.

Brief Description of the Related Art

In the shaft and inclined hoisting technology, so-called double-drum hoisting machines or double-drum Blair hoisting machines are used at small depths of up to 500 m and at great depths of 1,750 m to 3,000 m, said hoisting machines counteractively coiling and/or uncoiling one or two ropes per drum.

As a rule, at least one of the drums is configured as a loose drum and the other possibly as a fixed drum. The loose drum which is rotatably mounted on the main shaft via sliding bushings or rolling bearings is connected to the main shaft with a coupling device.

This coupling device must be configured as a switchable clutch (coupling and uncoupling) in order to be able to move the two drums relative to each other at any given time in standstill with engaged loose-drum brake.

In the course of the lifespan of hoisting ropes, the extension and the elongation of the ropes changes due to stresses during hoisting operation and self-weights. Since the different ropes of the corresponding drums always extend in differently large degrees in the process, in two-drum hoisting operation it must always be possible to move the two drums of a double-drum hoisting machine or of a double-drum Blair hoisting machine relative to each other in order to ensure a uniform and safe positioning of the one conveying means in the loading location at an underground work level and of the other conveying means in the unloading location. With a constellation of the described type it is possible to achieve, among other things, a compensation of rope elongations in loading and unloading locations.

However, at the same time, it can also occur in shaft and inclined hoisting operation that the hoisting of the hoisted material is to be relocated from one work level to another work level further above or below. Also for this purpose it must be possible to move the two drums of the hoisting machine relative to each other, in order to ensure a simultaneous positioning of the one conveying means in the unloading location and of the other conveying means in the loading location at the respective underground work level. A device of the described type also makes it possible, however, to approach different underground work levels correspondingly fast and accurately, while unloading takes place simultaneously on the surface.

Known coupling devices have e.g. a shaft wheel toothed on the outside and a drum wheel with interior toothing, both of which are mutually connected via an axially movable coupling or sliding wheel having interior and exterior toothing.

The toothing of the shaft wheel is as a rule configured such that it serves as guide toothing when the flank clearance is relatively small and always remains engaged with the interior toothing of the sliding wheel also in the uncoupled coupling state of the device.

These devices are switched via a non-rotating displacement collar/adjusting ring guided on the machine frame, said collar moving the coupling or sliding wheel having the interior and exterior toothing back and forth in an axial direction, and being able to couple and uncouple the toothing in the process. The displacing collar/adjusting ring is actuated here e.g. via two double-action hydraulic cylinders, which are possibly coupled with the displacing collar/adjusting ring via a knee-lever system.

It is disadvantageous in this arrangement that relative movements always occur between the stationary displacement collar/adjusting ring and the rotating coupling wheel during the normal hoisting operation. These relative movements lead to wear and ensuing maintenance effort. Further, these points represent potential disturbances. The relative movement also has a negative effect on the heating and the ensuing deformation of the components, additionally increasing the wear.

SUMMARY OF THE INVENTION

It is therefore the object of the present invention to provide a coupling device of the generic type which avoids the stated disadvantages of known devices, which is as easily as possible to realize and which makes possible low-maintenance, safe and cost-effective operation.

To achieve this object, a coupling device is provided for releasably connecting the at least one loose drum/loose wheel/drum wheel rotatably mounted on the main shaft of a hoisting machine with the main shaft, wherein the releasable connection of the loose drum with the main shaft is realized in form-fitting fashion by means of an engageable and disengageable sliding wheel guided on a shaft wheel, wherein, according to the invention, for engaging and disengaging the sliding wheel actuating means are provided which are distributed over the circumference of the sliding wheel at intervals, and acting at specific points immediately on the sliding wheel.

The advantages of this arrangement are that no separate adjusting collar or ring is required any longer and fewer masses have to be moved. Further advantages lie in the substantially lower wear due to the selective actuation and in that existing installations can be easily retrofitted.

In a preferred embodiment of the coupling device at least two actuating means distributed over the circumference of the sliding wheel are provided, wherein even more preferably three actuating means distributed over the circumference of the sliding wheel may be provided.

The small number of actuating means makes the installation easy to assemble and maintain.

It is further preferred that the actuating means are stationary and the sliding wheel can rotate past and over the former, such that the moved masses can be kept to a minimum.

In a particularly preferred embodiment of the coupling device the sliding wheel is supplied with a circumferential flange, onto which the actuating means act only during the coupling process. As actuating means of the sliding wheel it is preferred to provide axially adjustable claws that more preferably clasp the circumferential flange, wherein even more preferably a defined play is provided between the respective claw and the flange, such that the claws can be freed after actuating the sliding wheel.

On at least one of their inner sides facing the circumferential flange the claws can be supplied with a rubber buffer which comes into contact with the circumferential flange upon engaging and/or disengaging. More preferably that inner side of the claw is supplied with a rubber buffer, which, upon engagement of the sliding wheel, comes into contact with the flange of the former. In this fashion, the engaging forces can be reduced by soft engagement.

For the axial adjustment of the claws electrical adjusting devices can be provided, e.g. in the form of an electrical motor acting on a gear rod or a different suitable assembly.

By using the electrical adjusting devices, cost-intensive performance and control hydraulics can be omitted.

Finally, in a preferred embodiment the coupling device can also be configured such that the sliding wheel is supplied with tooth segments distributed over the outer and inner circumference instead of a respective complete circumferential toothing, for engagement with corresponding outer and inner toothings on the loose drum and the shaft wheel. In a further preferred embodiment, these tooth segments can also be configured as separate elements that can be incorporated in and detached from the sliding wheel and which can be connected thereto in force-fitting and/or form-fitting fashion. This solution makes it possible to exchange worn tooth segments in a simple and cost-effective fashion without having to exchange the complete coupling wheel or sliding wheel at once. The use of tooth segments instead of a complete toothing on the outer circumference of the sliding wheel consequently reduces the costs considerably.

BRIEF DESCRIPTION OF THE DRAWINGS

Further characteristics and advantages of the present invention may be taken from the following, in no way limiting, description of preferred embodiments of the invention in connection with the associated figures, showing in.

DETAILED DESCRIPTION OF THE PREFERRED EMBODIMENTS

Figure 1:
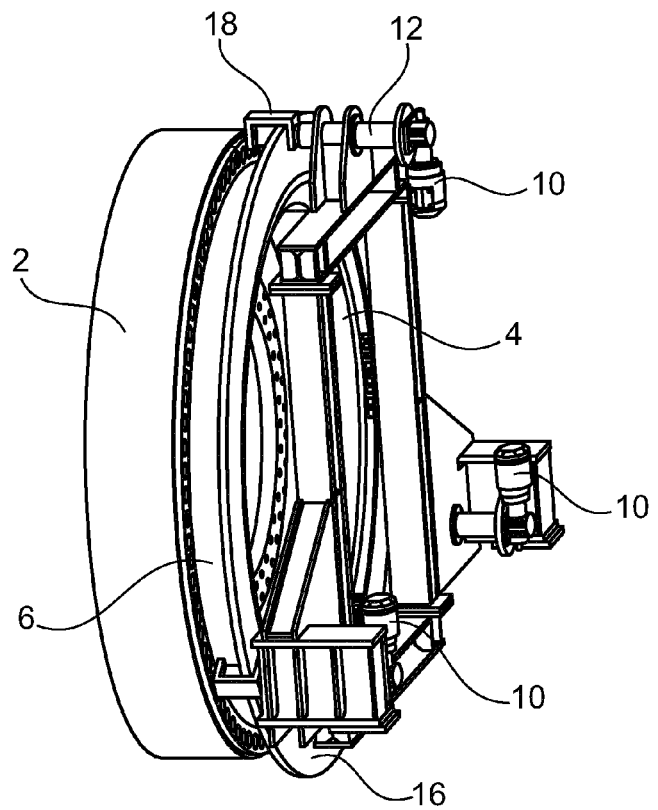
FIG. 1 a preferred embodiment of the coupling device in a coupled state with 3 actuating means.
Figure 2:
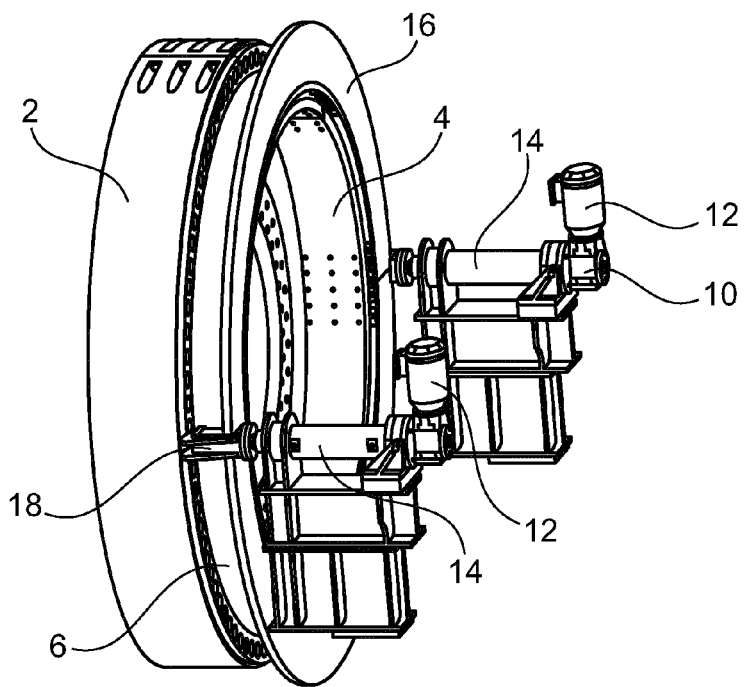
FIG. 2 a preferred embodiment of the coupling device in a coupled state with 2 actuating means.

FIGS. 1 and 2 show two preferred embodiments of a coupling device according to the present invention. Both figures show the coupled state of the coupling device. Corresponding elements also bear the corresponding reference numbers.

From FIGS. 1 and 2 the drum wheel 2 of a double-drum hoisting machine can be gathered in each case, and a corresponding shaft wheel 4 connected to a (not shown) main shaft of the double-drum hoisting machine.

Further, from FIGS. 1 and 2 also a coupling or sliding ring 6 can be gathered, which in the present case is guided via an outer toothing of the shaft wheel 4 and a corresponding inner toothing on the sliding ring 6.

Likewise, from FIGS. 1 and 2 actuating means 10 distributed over the circumference of the sliding ring 6 can be gathered, wherein in the case of FIG. 1 there are provided three and in the case of FIG. 2 there are provided two actuating means 10. In the represented embodiments of the coupling device the actuating means 10 are electric adjusting devices having an electric drive 12 and a driving rod 14.

As can likewise be gathered without any problem from FIGS. 1 and 2, the sliding wheel 6 is supplied with a circumferential flange 16. As can be gathered from the FIGS. 1 and 2, at the ends of the electrical adjusting devices 10 facing the loose drum, there are provided claws 18 which are axially adjustable with the aid of the electrical adjusting devices 10, wherein by means of the claws the sliding wheel 6 can be engaged and disengaged between the drum wheel 2 and the shaft wheel 4. With the electrical adjusting devices 10 having claws 18 which clasp the flange 16 of the sliding wheel 6 actuating means are provided which at specific points act directly onto the sliding wheel 6, making the use of additional, interposed elements superfluous, such as e.g. a displacing collar.

With the aid of the device described with reference to FIGS. 1 and 2, a form-fitting, releasable connection is achieved of the drum wheel 2 that is firmly connected to the not represented loose drum with the main shaft (not represented) of a double-drum hoisting machine, by means of the engageable and disengageable sliding wheel 6 guided on the shaft wheel 4.

Figure 3A:
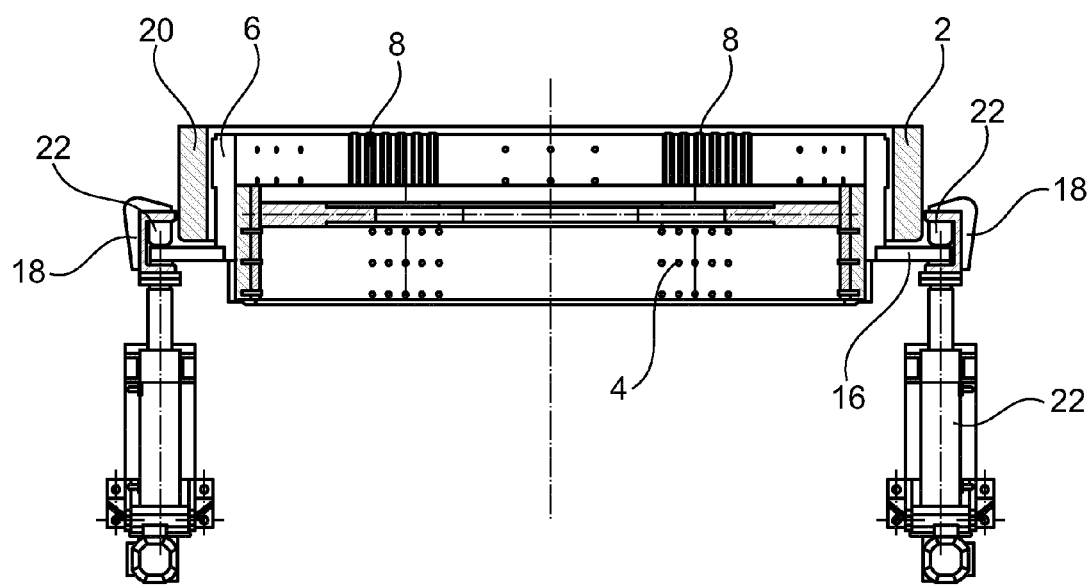
FIG. 3a a cross section through the embodiment according to FIG. 2 in an uncoupled state.
Figure 3B:
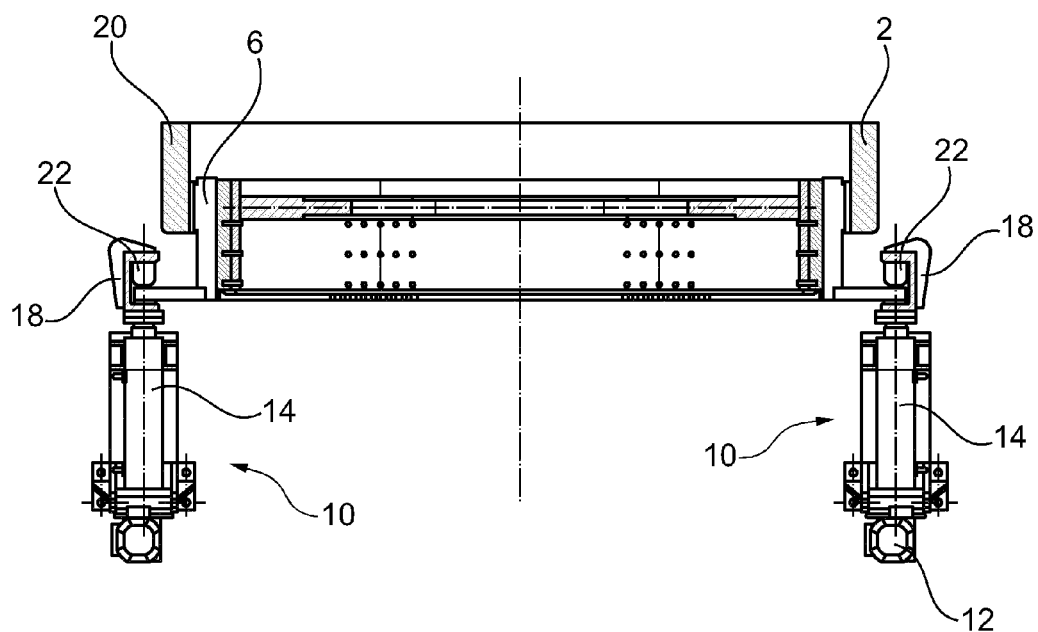
FIG. 3b a cross section through the embodiment according to FIG. 2 in a coupled state.

The establishment of the releasable form fit of the sliding ring 6 with the drum wheel 2 can best be gathered from FIGS. 3a and 3b, which show the coupling device of FIG. 2 in a cross section, wherein FIG. 3a shows the uncoupled state and FIG. 3b the coupled state. Elements that are identical in FIGS. 1 and 2 also bear identical reference numbers.

As can be gathered from FIGS. 3a and 3b, the drum wheel 2 is not supplied with an inner toothing 20 over its complete width, but only on its half facing the sliding wheel 2. Corresponding to the arrangement of the inner toothing 20 of the drum wheel 2, the sliding wheel 6 likewise has an outer toothing only on its half facing the drum wheel 2. When the sliding wheel 6 is now pushed into the drum wheel 2 with the aid of the actuating means 10, as shown in FIG. 3a, there is no connection any longer between the shaft wheel 4 and the drum wheel 2, such that rope extensions etc. can be compensated by a relative rotation of the drum wheel 2, before the sliding wheel 6, as shown in FIG. 3b, engages the shaft wheel 4 again due to removal from the drum wheel 2. As can be gathered from FIG. 3a, the inner and outer toothings of the sliding wheel 6 in the represented embodiment are not provided as a complete toothing, but in the form of tooth segments 8, which are exchangeably incorporated into the outer (not shown) and inner circumference of the sliding wheel 6, such that wear of the form-fitting coupling can be remedied by simple exchange of the tooth segments 8.

As can be gathered easily from FIGS. 3a and 3b, the claws 18 of the electrical adjusting devices 10 clasping the flange 16 of the sliding wheel 6 are supplied with rubber buffers 22 in the disengagement direction, i.e. in the coupling direction of the device. The local power input directly onto the sliding wheel 6 performed around the circumference of the sliding wheel 6 is thus complemented here by a reduction of the engaging forces, since the rubber buffers 22 can react in a correspondingly elastic way when the position of the inner toothing 20 of the drum wheel 2 is offset from the tooth segments 8 of the sliding wheel 6, without leading to immediate damages of the mutually opposing toothings. A corresponding switch-off of the engagement process can be effected here by a monitoring unit (e.g. capturing of torque, force or current intensity) for the electrical adjusting means.

The rubber buffers 22 are provided within the claws 18 with a corresponding clearance relative to the flange 16, so that the former can be freed in order to reduce wear. The flange 16 can consequently rotate freely past and over rubber buffers 22 or other parts of the claws 18 without contact.

Only during a coupling operation, when the rope carrier brake is engaged (not shown) are the actuating devices 10 protracted or retracted and engage or disengage the sliding wheel. Upon disengagement, the driving gearing between the drum wheel 2 and the sliding wheel 6 is separated completely, wherein the guiding gearing between the sliding wheel 6 and the shaft wheel 4 is maintained.

The invention claimed is:

1. A coupling device for releasably connecting at least one loose drum that is rotatably mounted on a main shaft of a hoisting machine and a drum wheel firmly connected thereto with a shaft wheel that is firmly connected to the main shaft, wherein a releasable connection of the loose drum with the main shaft is realized in form-fitting fashion by means of an engageable and disengageable sliding wheel guided on a shaft wheel, wherein for engaging and disengaging the sliding wheel actuating means are provided that are distributed over a circumference of the sliding wheel, acting directly at specific points onto the sliding wheel and wherein the actuating means are stationary and the sliding wheel can rotate past and over the former in a contactless fashion during the operation of the hoisting machine.

2. The coupling device according to claim 1, wherein the sliding wheel is supplied with a circumferential flange onto which the actuating means act.

3. The coupling device according to claim 1, wherein as actuating means of the sliding wheel axially adjustable claws are provided which clasp a circumferential flange.

4. The coupling device according to claim 3, wherein a defined play is provided between the respective claw and the circumferential flange.

5. The coupling device according to claim 3, wherein the axially adjustable claws have inner sides and wherein the axially adjustable claws are supplied with a rubber buffer or other elastic elements on at least one of their inner sides facing the circumferential flange which enter(s) into contact with the circumferential flange upon engaging and/or disengaging.

6. The coupling device according to claim 3, wherein for axially adjusting the claws, electrical adjusting devices or similarly acting devices are provided.

7. The coupling device according to claim 1, wherein displacement paths of the sliding wheel are provided with a path limitation device.

8. A coupling device for releasably connecting at least one loose drum that is rotatably mounted on a main shaft of a hoisting machine and a drum wheel firmly connected thereto with a shaft wheel that is firmly connected to the main shaft, wherein a releasable connection of the loose drum with the main shaft is realized in form-fitting fashion by means of an engageable and disengageable sliding wheel guided on a shaft wheel, wherein for engaging and disengaging the sliding wheel actuating means are provided that are distributed over a circumference of the sliding wheel, acting directly at specific points onto the sliding wheel, wherein at least two actuating means are provided that are distributed over the circumference of the sliding wheel.

9. The coupling device according to claim 8, wherein the at least two actuating means are stationary and the sliding wheel can rotate past and over the former in a contactless fashion during the operation of the hoisting machine.

10. A coupling device for releasably connecting at least one loose drum that is rotatably mounted on a main shaft of a hoisting machine and a drum wheel firmly connected thereto with a shaft wheel that is firmly connected to the main shaft, wherein a releasable connection of the loose drum with the main shaft is realized in form-fitting fashion by means of an engageable and disengageable sliding wheel guided on a shaft wheel, wherein for engaging and disengaging the sliding wheel actuating means are provided that are distributed over a circumference of the sliding wheel, acting directly at specific points onto the sliding wheel, wherein the sliding wheel is supplied with tooth segments distributed over an outer and inner circumference, for engagement with corresponding outer and inner toothings on the loose drum and the shaft wheel.

* * * * *